UNITED STATES PATENT OFFICE.

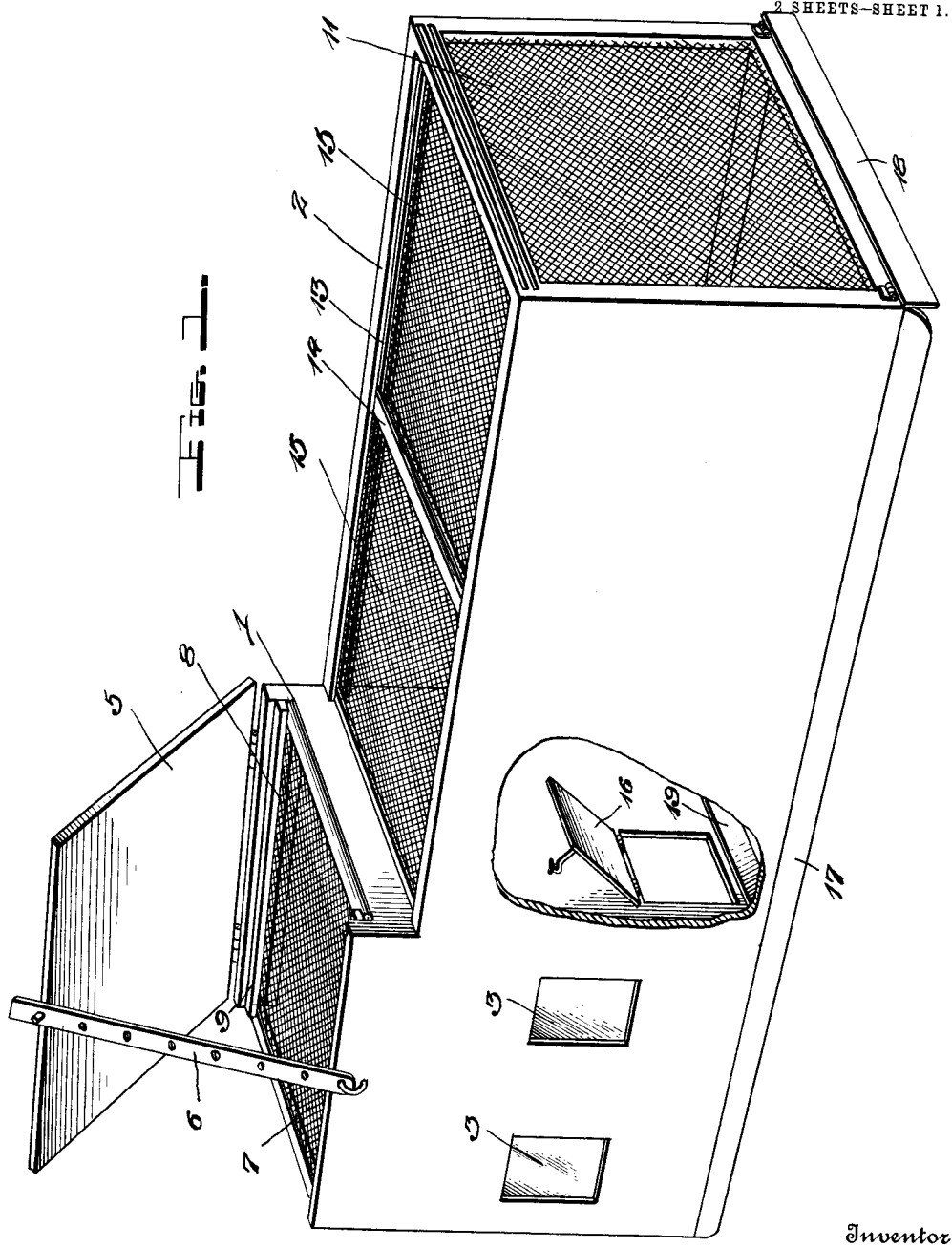

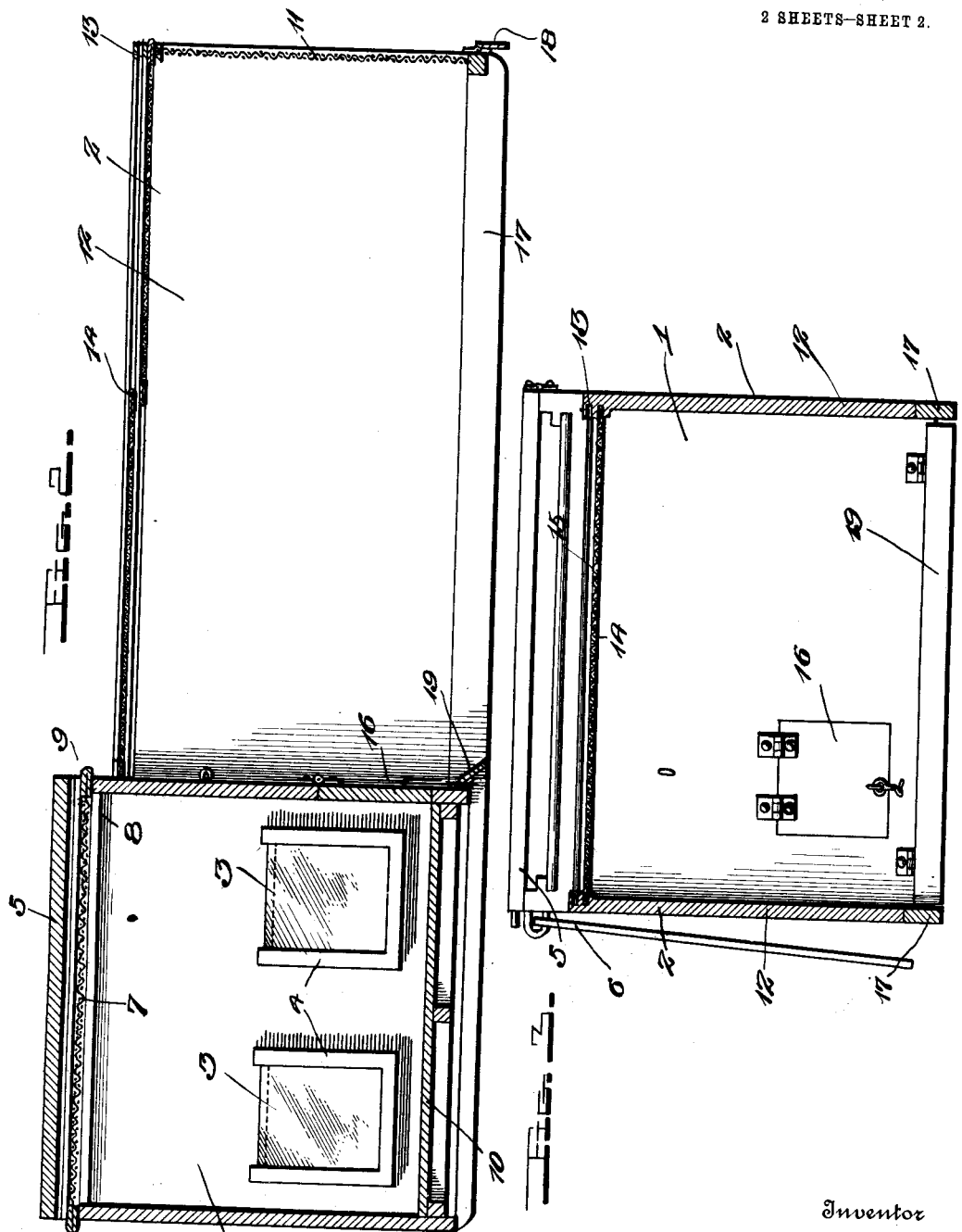

CLYDE DELAY, OF SANDBORN, INDIANA.

POULTRY-BROODER.

1,079,545.  Specification of Letters Patent.  Patented Nov. 25, 1913.

Application filed February 26, 1912. Serial No. 680,041.

*To all whom it may concern:*

Be it known that I, CLYDE DELAY, a citizen of the United States, residing at Sandborn, in the county of Knox and State of Indiana, have invented certain new and useful Improvements in Poultry-Brooders, of which the following is a specification, reference being had to the accompanying drawings.

This invention relates to new and useful improvements in poultry brooding appliances and it consists in certain improvements therein having for their object to provide in a sanitary and inexpensive structure, a combined screened inclosure and housing which may be readily moved from place to place and to which at all times access may be conveniently had for any of the purposes involving the care of young chicks.

A further object of the invention resides in the provision of a brooding coop which will possess advantages in points of efficiency and durability, is inexpensive of manufacture and at the same time is simple in construction and operation.

With the above and other objects in view, the invention consists in the novel features of construction, combination and arrangement of parts as will be hereinafter more fully described, pointed out in the claim and shown in the accompanying drawings, in which—

Figure 1 is a perspective view of a brooder coop constructed in accordance with my invention; Fig. 2 is a longitudinal sectional view; and Fig. 3 is a transverse sectional view.

Referring more particularly to the drawings, 1 indicates the main or body portion and 2 the extension or runway for the chicks. The main or covered portion comprises a substantially rectangular body portion provided in the front thereof with sliding removable panes 3, in suitable framework 4. A hinged roof 5 is suitably hinged to the rear of the top of the body and completely covers the same and is adjustably retained in an open position by the perforated link 6 secured to the front side of the body as shown in Fig. 1.

When the roof 5 is in a raised position, a screen 7 is provided to close the upper end of the body 1 against the intrusion of cats, dogs or other animals and to prevent the chickens from getting out. This screen 7 is secured to the frame 8 which is slidably mounted in the grooves or guides 9 formed in the portion near the top thereof.

It will be noted from reference to Figs. 2 and 3 that the front and rear walls of the body of the brooder are extended above the side walls thereof, so that when the top 5 is in its closed position, the same is spaced above the screen 7, thus permitting the foul air within the brooder to readily escape.

A removable floor 10 is arranged in the body and suitably supported by cleats as shown or in any other suitable manner. The runway 2 comprises the end wall 11 and the side walls 12, said side walls being an extension of the front and rear walls of the body portion. The side walls 12 of the runway are cut down at the side edges of the body 1 so as to bring their top edges somewhat below the edges of the body.

Grooves or guides 13 are formed on the inner sides of the walls 12 and arranged near the top thereof. Sliding frames 14 are provided mounted in the grooves 13, said frames being arranged one above the other and adapted for sliding movement in opposite directions. Screening 15 is secured to the upper side of the frames 14 which forms a protection for the small chickens and also prevents them from escaping over the side walls of the runway.

A door 16 is formed in the side wall of the body forming communication between the body and the runway. The body and runway are mounted on suitable runners 17 so that they may be moved from place to place. An end board 18 is hinged to the bottom edge of the end wall 11 and adapted to close the space between the ground and the bottom edge of the end wall. A run board 19 is hinged to the bottom edge of the body 1 and adapted to close the space between the ground and the bottom edge of the body. The board 19 is arranged adjacent the lower end of the door 16 and is used as a run board for the chickens while passing from the body to the runway.

While I have shown and described the proferred form of my invention it will be obvious that various changes in the details of construction and in the proportions may be resorted to for successfully carrying my invention into practice without sacrificing any of the novel features or departing from the scope of the invention.

Having thus described this invention, what is claimed is:—

A brooder coop comprising longitudinal walls having corresponding portions at their opposite ends extended above the remainder of said walls and a transverse partition formed therewith, a rear end wall, said rear end wall, partition, and tall portions of the longitudinal walls forming the walls of a brooding compartment, a portion of the upper edge of the partition being cut away, the extended portions of the longitudinal walls having guide grooves formed in their inner faces adjacent their upper edges to accommodate a slidable perforated top member for the brooding compartment, a hinged solid cover for the brooding compartment hinged to the upper edge of one of the longitudinal walls and adapted when in its lowermost position to cover the brooding compartment, means for retaining the cover in raised position, the remainder of the coop forming a runway, a perforated slidable cover for the runway, and a perforated front end wall for the runway, said partition having an opening therein to form communication between the brooding compartment and the runway and being provided with means for closing said opening.

In testimony whereof I hereunto affix my signature in the presence of two witnesses.

CLYDE DELAY.

Witnesses:
C. F. AGCTON,
MARK McKIM.

Copies of this patent may be obtained for five cents each, by addressing the "Commissioner of Patents, Washington, D. C."